United States Patent
Yoda et al.

(10) Patent No.: US 8,780,525 B2
(45) Date of Patent: Jul. 15, 2014

(54) CAPACITOR

(75) Inventors: Takeharu Yoda, Saku (JP); Kenichi Tateyama, Miyakonojo (JP); Kiyokazu Yanagihashi, Miyakonojo (JP); Yoshikuni Kato, Miyakonojo (JP)

(73) Assignee: Soshin Electric Co., Ltd., Saku (JP)

( * ) Notice: Subject to any disclaimer, the term of this patent is extended or adjusted under 35 U.S.C. 154(b) by 0 days.

(21) Appl. No.: 14/124,361

(22) PCT Filed: Jun. 7, 2012

(86) PCT No.: PCT/JP2012/064652
§ 371 (c)(1),
(2), (4) Date: Dec. 6, 2013

(87) PCT Pub. No.: WO2013/002003
PCT Pub. Date: Jan. 3, 2013

(65) Prior Publication Data
US 2014/0126107 A1    May 8, 2014

(30) Foreign Application Priority Data

Jun. 29, 2011  (JP) .................................. 2011-143818

(51) Int. Cl.
*H01G 9/00* (2006.01)
*H01G 4/228* (2006.01)

(52) U.S. Cl.
USPC ........................................ 361/328; 361/308.1

(58) Field of Classification Search
USPC ................................ 361/328–329, 308.1, 310
See application file for complete search history.

(56) References Cited

U.S. PATENT DOCUMENTS

| | | | |
|---|---|---|---|
| 6,917,510 B1* | 7/2005 | Prymak | 361/309 |
| 8,018,712 B2* | 9/2011 | Yang et al. | 361/328 |
| 8,243,463 B2* | 8/2012 | Azuma et al. | 361/763 |
| 8,315,035 B2* | 11/2012 | Togashi et al. | 361/306.3 |
| 8,416,556 B2* | 4/2013 | Grimm et al. | 361/306.1 |
| 2003/0011959 A1* | 1/2003 | Moriwaki et al. | 361/308.1 |

FOREIGN PATENT DOCUMENTS

| | | |
|---|---|---|
| JP | 2000-286150 A1 | 10/2000 |
| JP | 3357314 B2 | 12/2002 |
| JP | 3771977 B2 | 5/2006 |
| JP | 2011-096786 A1 | 5/2011 |

OTHER PUBLICATIONS

International Search Report and Written Opinion (PCT/JP2012/064652) dated Sep. 18, 2012.

* cited by examiner

*Primary Examiner* — Eric Thomas
(74) *Attorney, Agent, or Firm* — Burr & Brown, PLLC

(57) ABSTRACT

This capacitor has: a single capacitor block provided with a plurality of capacitor elements electrically connected in parallel, each of said capacitor elements having a terminal part on each end; a first electrode plate that electrically connects the first terminal parts of the capacitor elements; a second electrode plate that electrically connects the second terminal parts of the capacitor elements and continues on to the side where the first terminal parts are; and at least one bypass electrode plate that electrically bypasses the second electrode plate.

9 Claims, 13 Drawing Sheets

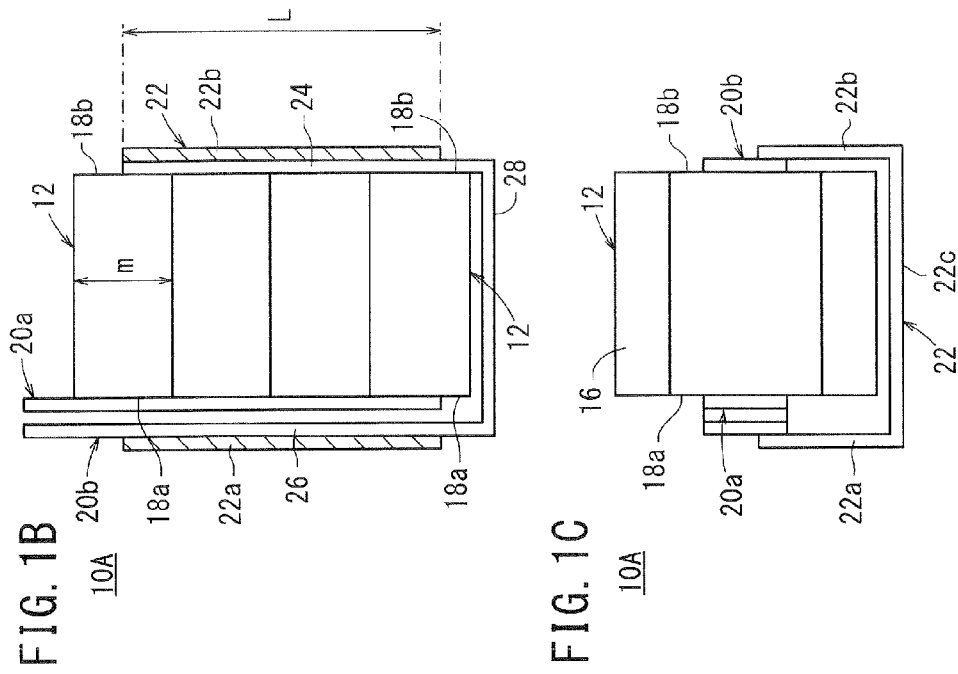
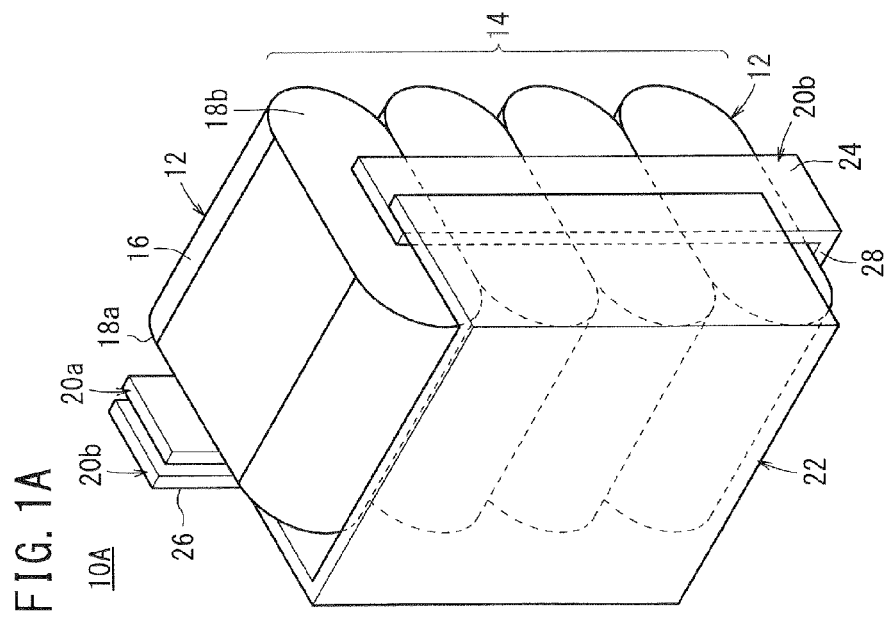

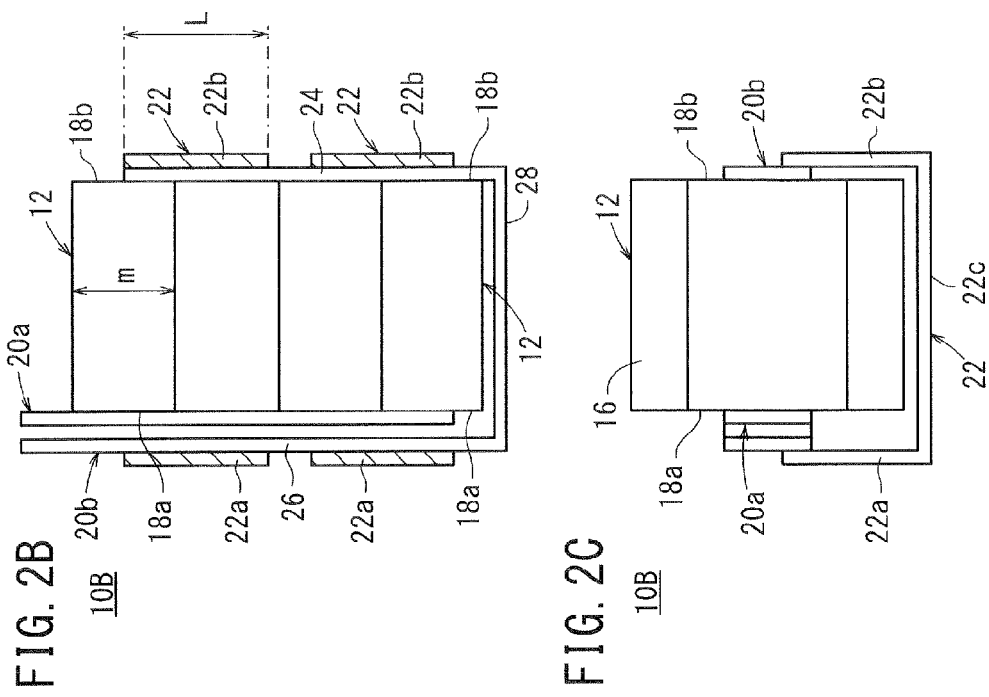
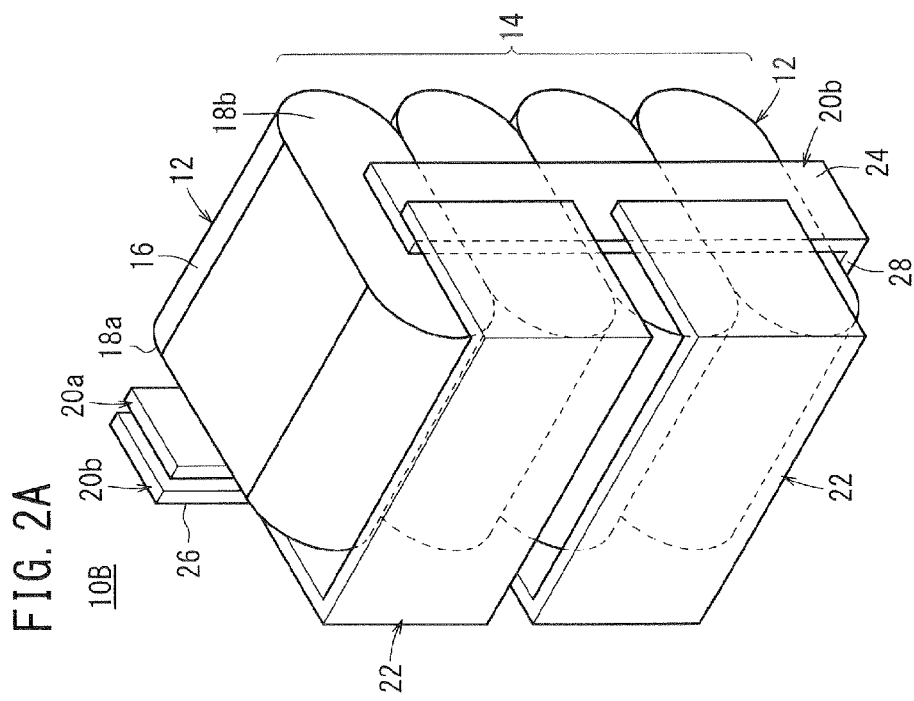

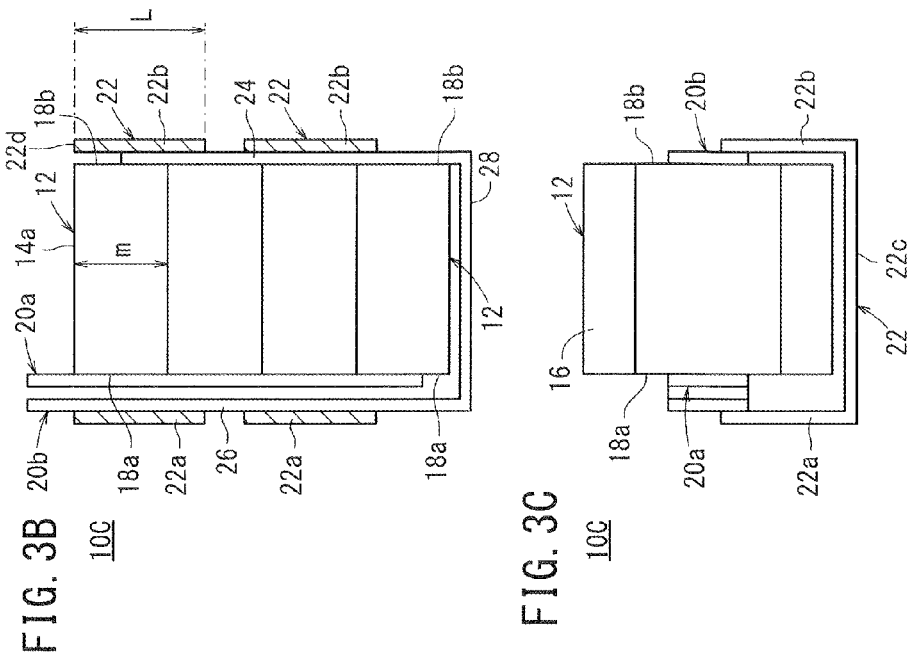
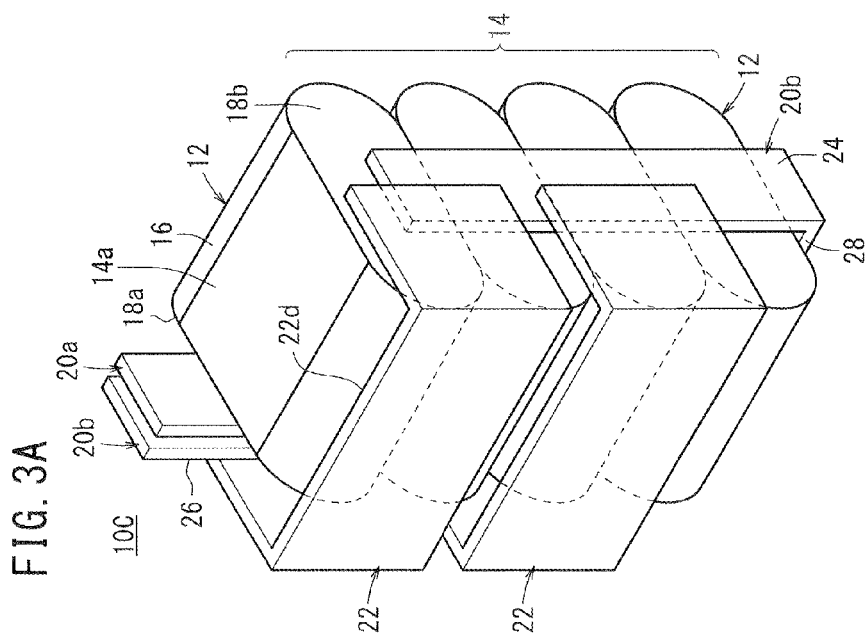

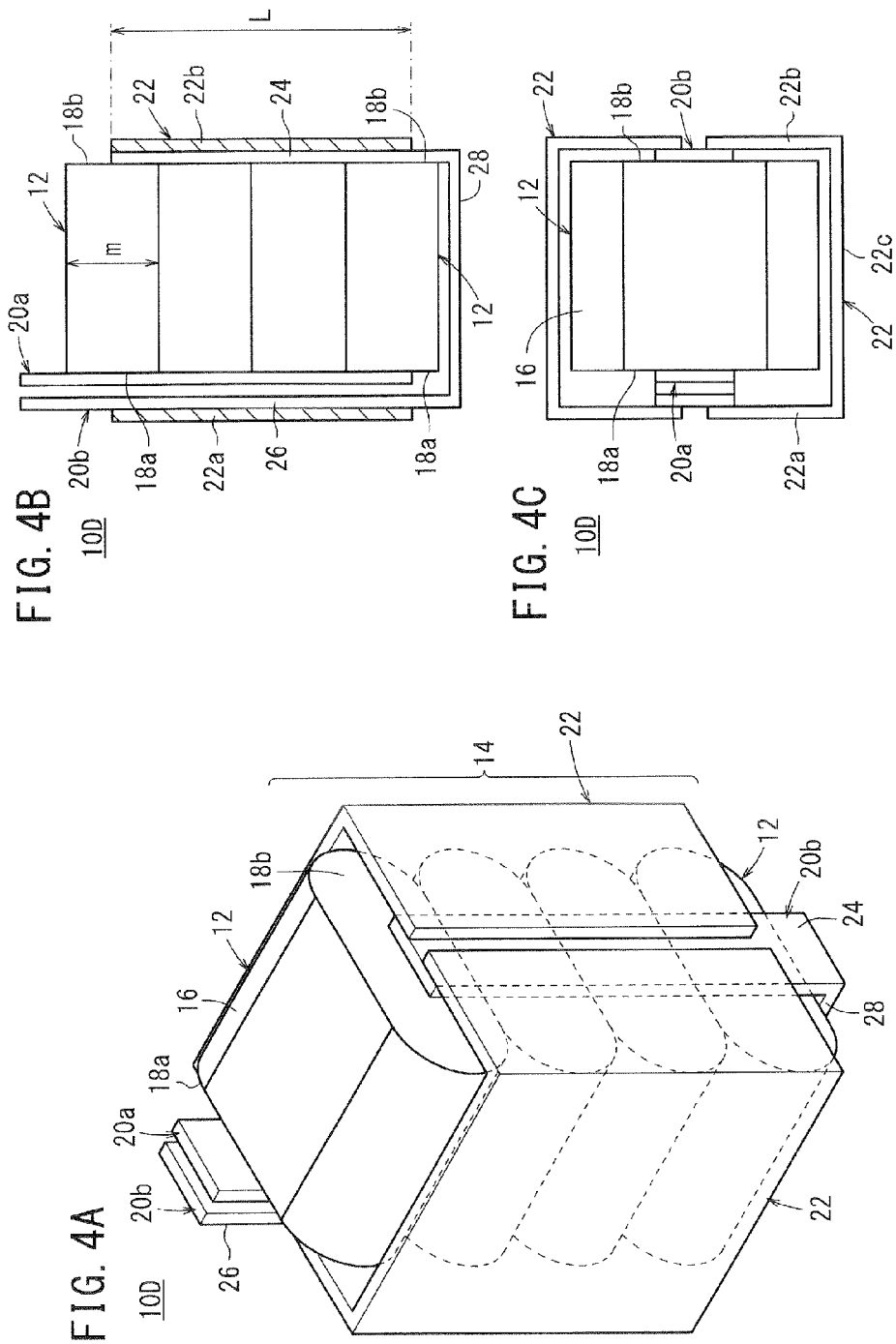

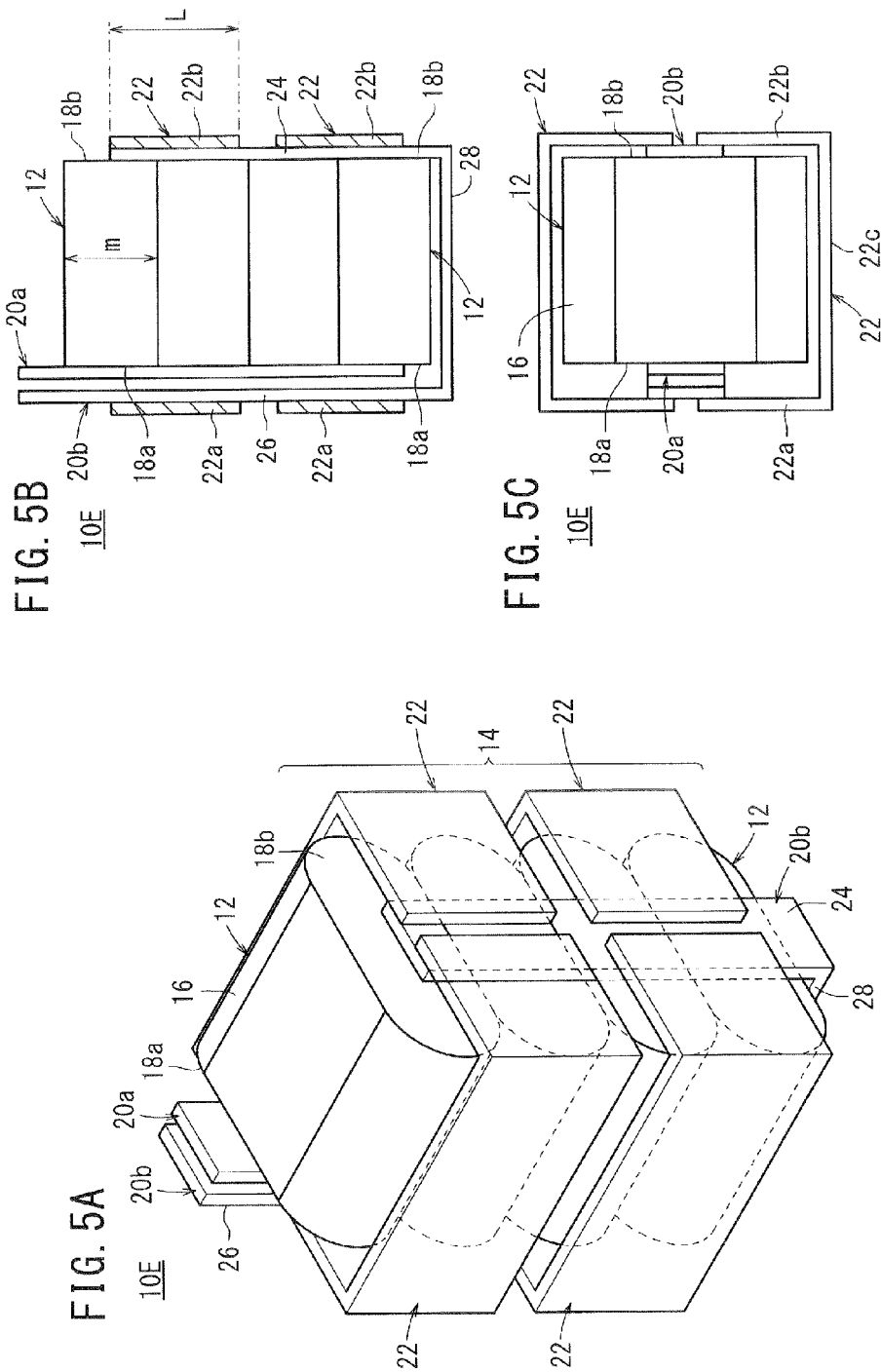

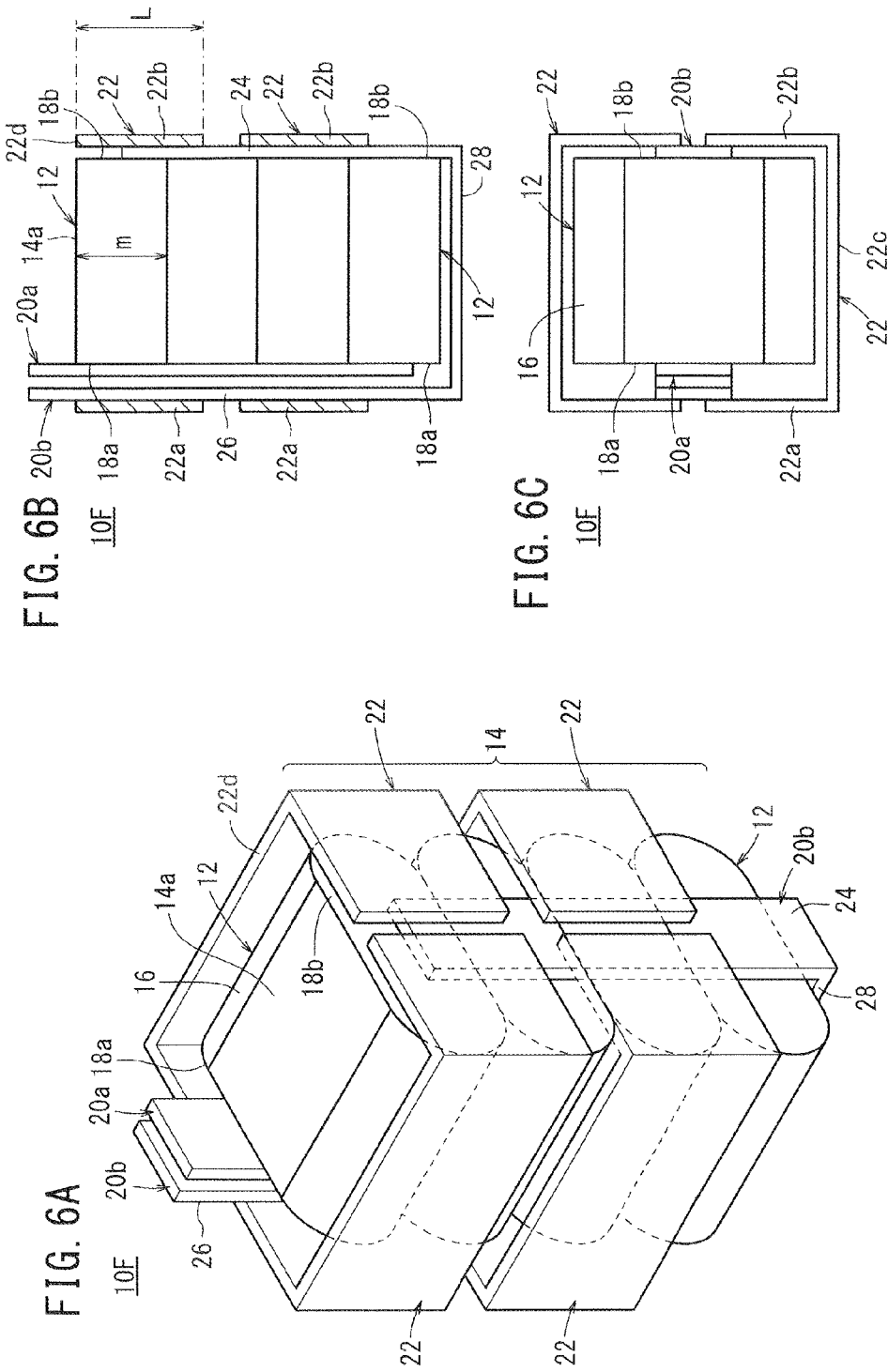

10H

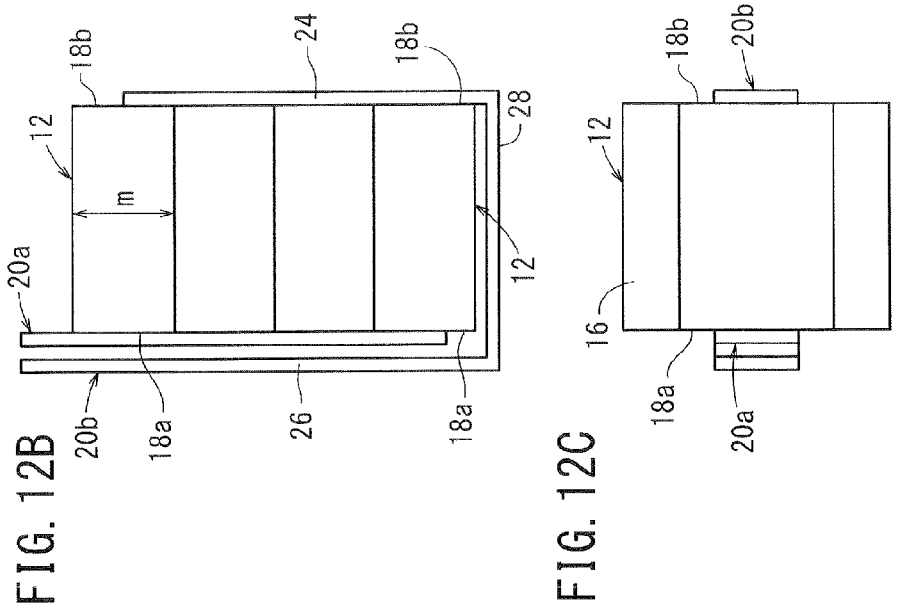
FIG. 12B
FIG. 12C
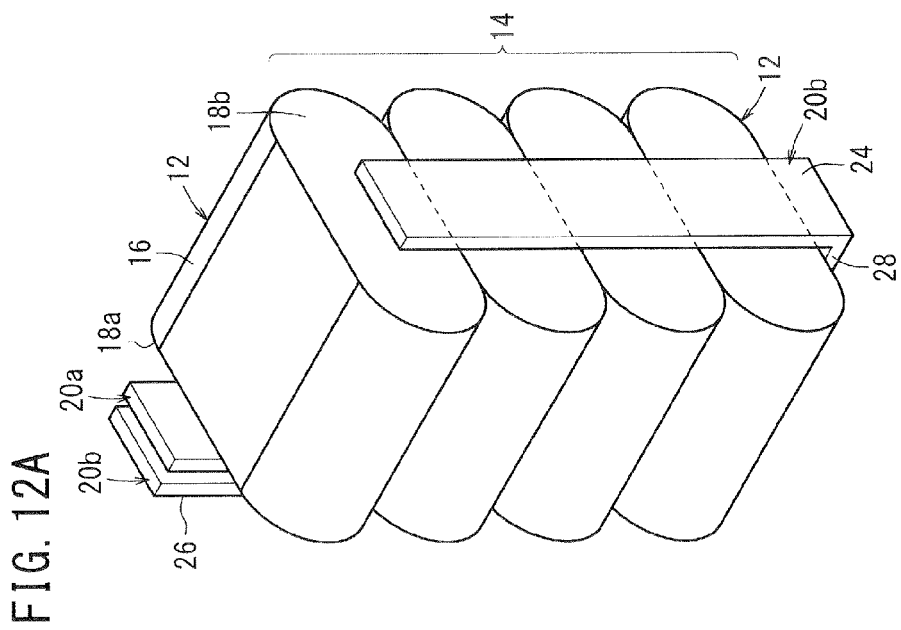
FIG. 12A

CAPACITOR

TECHNICAL FIELD

The present invention relates to a capacitor employing a capacitor block made up of a plurality of capacitor elements which are electrically connected parallel to each other.

BACKGROUND ART

Generally, a capacitor having a large capacitance in excess of 100 µF employs a capacitor block that is fabricated by preparing a plurality of capacitor elements each having a capacitance smaller than 100 µF or of about 100 µF in order to provide a required electrostatic capacitance and connecting the capacitor elements parallel to each other with connectors such as flat-stranded copper wires or the like. Some capacitors have a plurality of such capacitor blocks connected parallel to each other.

When such a capacitor is used as a smoothing capacitor in an electric power converter such as an inverter or the like, a ripple current having a carrier frequency or the like from the inverter flows through the capacitor. At this time, the capacitor elements and the connectors are self-heated and tend to have their service life shortened. Heretofore, parallel flat plates have been used as the connectors by which the capacitor elements are connected parallel to each other for lowering the self-inductance, improving the high-frequency characteristics and reducing the self-heating of the capacitor (see Japanese Patent No. 3771977 and Japanese Patent No. 3357314).

SUMMARY OF THE INVENTION

Japanese Patent No. 3771977 discloses various connecting structures of parallel flat plates. However, since the illustrated connecting structures are primarily of an insulated design, not enough consideration is given to the connecting length for folded electrodes and hence the self-inductance is not sufficiently lowered.

According to Japanese Patent No. 3357314, attention is focused on currents flowing through the capacitor elements, and a connecting structure is made up of parallel flat plates in the opposite direction to the currents in surrounding relation to the sides of a capacitor block (a capacitor block assembled of a plurality of capacitor elements in five rows and two columns). However, as shown in FIG. 2(e) of Japanese Patent No. 3357314, since the connecting structure is of an integral casing structure, difficulty arises in assembling the parts into a capacitor. Specifically, according to the structure disclosed in Japanese Patent No. 3357314, as shown in FIG. 2(e), connection plates 6a on both sides surrounding the sides of the capacitor block and an extension plate 6b are of an integral structure. For assembling the parts into a capacitor, a connecting plate 4a is connected to one terminal for the capacitor block, and a connecting plate 4b is connected to the other terminal therefor, after which an extension plate 5 is connected to the connecting plate 4a. Thereafter, the capacitor block is inserted into a space surrounded by the two connection plates 6a and the single extension plate 6b, and the ends of the two connection plates 6a are connected to the connecting plate 4b.

With the structure disclosed in Japanese Patent No. 3357314, it is tedious to insert the capacitor block into the space surrounded by the two connecting plates 6a and the single extension plate 6b that are integral with each other. In addition, it is difficult to hold the parts when the connecting and extension plates are connected, and also to assemble the parts. Furthermore, it is necessary to prepare a dedicated connecting structure (casing structure) depending on the size of the capacitor block. The dedicated connecting structure is unable to deal with specification changes and is liable to cause an increase in cost.

Although the capacitor disclosed in Japanese Patent No. 3357314 is said to have its self-inductance reduced to about ¼ of conventional capacitors, the stated reduction in the self-inductance is not sufficient.

The present invention has been made in view of the above problems. It is an object of the present invention to provide a capacitor which does not require a dedicated connecting structure to be prepared, is able to deal flexibly with specification changes or the like, is of a reduced cost, and has its self-inductance lowered.

[1] According to the present invention, there is provided a capacitor which employs a capacitor block made up of a plurality of capacitor elements which are electrically connected parallel to each other, each of the capacitor elements having terminals on respective ends thereof, comprising a first electrode plate electrically connecting respective ones of the terminals of the capacitor elements, a second electrode plate electrically connecting respective other ones of the terminals of the capacitor elements and extending toward the ones of the terminals, and at least one bypass electrode plate electrically bypassing the second electrode plate, wherein the second electrode plate includes a connector electrically connecting the respective other ones of the terminals of the capacitor elements, an extension facing the first electrode plate, and a joint interconnecting the connector and the extension, the connector, the extension, and the joint being integral with each other, the bypass electrode plate includes a first joint electrically connected to the extension of the second electrode plate, a second joint electrically connected to the connector of the second electrode plate, and a third joint interconnecting the first joint and the second joint, the first joint, the second joint, and the third joint being integral with each other, the joint of the second electrode plate is positioned below a lower surface of the capacitor block, and the third joint of the bypass electrode plate is positioned in facing relation to a side of the capacitor block.

[2] In the present invention, the bypass electrode plate comprises at least two bypass electrode plates disposed in confronting relation to each other across the capacitor block interposed therebetween.

[3] In the present invention, the bypass electrode plate comprises at least two bypass electrode plates arrayed along one side of the capacitor block.

[4] In the present invention, the at least one bypass electrode plate has an upper end positioned substantially in alignment with an upper surface of the capacitor block.

[5] In the present invention, the capacitor elements of the capacitor block are stacked along a stacked direction, and if a length of the bypass electrode plate along the stacked direction of the capacitor elements is indicated by L, a number of the capacitor elements of the capacitor block by N, and a length of each of the capacitor elements along the stacked direction by m, then the length L falls in a range of:

$$m < L < m \times N.$$

[6] In the present invention, the length L falls in a range of:

$$m \times (N-1) < L < m \times N.$$

[7] In the present invention, the length L of the at least one bypass electrode plate falls in a range of:

$$m < L < 2 \times m.$$

[8] In the present invention, the capacitor further comprises a compound capacitor block made up of an array of at least two of the capacitor blocks having mutually facing sides.

[9] In the present invention, the capacitor further comprises a cooling member for cooling at least one of the ones of the terminals and the other ones of the terminals of the capacitor block, wherein the cooling member is disposed in confronting relation to at least one of a region where the ones of the terminals of the capacitor block are arrayed and a region where the other ones of the terminals of the capacitor block are arrayed.

The capacitor according to the present invention does not require a dedicated connecting structure to be prepared, is able to deal flexibly with specification changes, is of a reduced cost, and has its self-inductance lowered.

Usually, when a current greater than an allowable current flows through a capacitor, the temperature of the capacitor rises with time beyond the allowable temperature for the capacitor until eventually the capacitor may possibly produce smoke and catch fire. However, since the capacitor has the cooling member, the temperature of the capacitor does not go beyond the allowable temperature therefor even when a current greater than an allowable current flows through the capacitor. Therefore, the capacitor is prevented from suffering the above drawbacks.

BRIEF DESCRIPTION OF DRAWINGS

FIG. 1A is a perspective view of a capacitor according to a first embodiment (first capacitor);

FIG. 1B is a side elevational view of the first capacitor with a bypass electrode plate being partly cut away;

FIG. 1C is a plan view of the first capacitor seen from above;

FIG. 2A is a perspective view of a capacitor according to a second embodiment (second capacitor);

FIG. 2B is a side elevational view of the second capacitor with a bypass electrode plate being partly cut away;

FIG. 2C is a plan view of the second capacitor seen from above;

FIG. 3A is a perspective view of a capacitor according to a third embodiment (third capacitor);

FIG. 3B is a side elevational view of the third capacitor with a bypass electrode plate being partly cut away;

FIG. 3C is a plan view of the third capacitor seen from above;

FIG. 4A is a perspective view of a capacitor according to a fourth embodiment (fourth capacitor);

FIG. 4B is a side elevational view of the fourth capacitor with a bypass electrode plate being partly cut away;

FIG. 4C is a plan view of the fourth capacitor seen from above;

FIG. 5A is a perspective view of a capacitor according to a fifth embodiment (fifth capacitor);

FIG. 5B is a side elevational view of the fifth capacitor with a bypass electrode plate being partly cut away;

FIG. 5C is a plan view of the fifth capacitor seen from above;

FIG. 6A is a perspective view of a capacitor according to a sixth embodiment (sixth capacitor);

FIG. 6B is a side elevational view of the sixth capacitor with a bypass electrode plate being partly cut away;

FIG. 6C is a plan view of the sixth capacitor seen from above;

FIG. 12A is a perspective view of a capacitor according to a comparative example;

FIG. 12B is a side elevational view of the capacitor according to the comparative example with a bypass electrode plate being partly cut away;

FIG. 12C is a plan view of the capacitor seen from above according to the comparative example.

DESCRIPTION OF EMBODIMENTS

Figure 7:
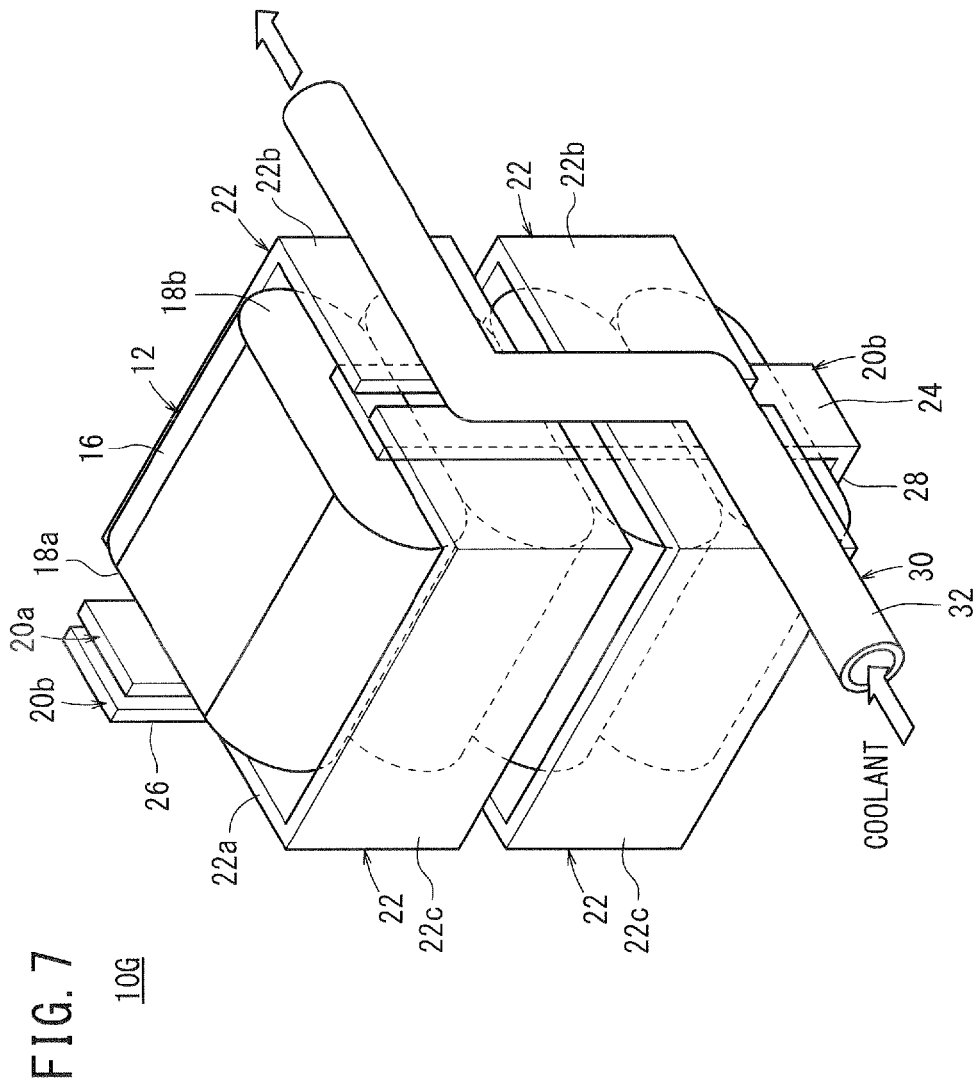
FIG. 7 is a perspective view of a capacitor according to a seventh embodiment (seventh capacitor)

Capacitors according to embodiments of the present invention will be described below with reference to FIGS. 1A through 13. The capacitors to be described below have only essential parts illustrated, and outer cases, outer terminals, fillers, etc. of the capacitors in their product forms are omitted from description and illustration.

As shown in FIG. 1A, a capacitor according to a first embodiment (hereinafter referred to as "first capacitor 10A") has a single capacitor block 14 made up of a plurality of capacitor elements 12. In the capacitor block 14, the capacitor elements 12 are stacked along one direction, i.e., a stacked direction. In the example shown in FIGS. 1A through 1C, the four capacitor elements 12 are vertically stacked into the single capacitor block 14.

Each of the capacitor elements 12 comprises a roll 16, a first terminal 18a electrically connected to an end of the roll 16, and a second terminal 18b electrically connected to the other end of the roll 16. The roll 16 has a first electrode pattern and a second electrode pattern that face each other with a dielectric film sandwiched therebetween and are coiled into a rolled structure. For example, the roll 16 includes a first dielectric film with a first electrode pattern disposed on one surface thereof, and a second dielectric film with a second electrode pattern disposed on one surface thereof, the first and second dielectric films being superposed one on the other with the first and second electrode patterns being kept out of contact with each other, and coiled into a rolled structure. Each of the first and second dielectric films may be made of PP (polypropylene), PET (polyethylene terephthalate), PPS (polyphenylene sulfide), or the like. The first terminal 18a and the second terminal 18b are formed by thermal spraying the one and other ends of the roll 16 with metal such as solder, zinc, or the like.

As shown in FIGS. 1A through 1C, the first capacitor 10A includes a first electrode plate 20a electrically connecting the respective first terminals 18a of the capacitor elements 12, and a second electrode plate 20b electrically connecting the respective second terminals 18b of the capacitor elements 12 and extending toward the first terminals 18a. In other words, the first capacitor 10A has its capacitor elements 12 electrically connected parallel to each other by the first electrode plate 20a and the second electrode plate 20b.

The first capacitor 10A also includes a single bypass electrode plate 22 that electrically bypasses the second electrode plate 20b. Specifically, the second electrode plate 20b includes a connector 24 electrically connecting the respective second terminals 18b of the capacitor elements 12, an extension 26 extending toward the first terminals 18a of the capacitor elements 12 and facing the first electrode plate 20a, and a joint 28 interconnecting the connector 24 and the extension 26, the connector 24, the extension 26, and the joint 28 being integral with each other. The joint 28 of the second electrode plate 20b is positioned below the lower surface of the capacitor block 14. In other words, the second electrode plate 20b has its connecting length greater than the first electrode plate 20a. Insulating plates, not shown, are interposed for electric insulation between the joint 28 of the second electrode plate 20b and the capacitor element 12 (the capacitor element 12 in the lowermost position) and between the extension 26 of the second electrode plate 20b and the first electrode plate 20a.

The bypass electrode plate 22 includes a first joint 22a electrically connected to the extension 26 of the second electrode plate 20b, a second joint 22b electrically connected to the connector 24 of the second electrode plate 20b, and a third joint 22c interconnecting the first joint 22a and the second joint 22b, the first joint 22a, the second joint 22b, and the third joint 22c being integral with each other. The third joint 22c of the bypass electrode plate 22 is positioned in facing relation to one side of the capacitor block 14. In other words, the bypass electrode plate 22 is electrically connected to the second electrode plate 20b in surrounding relation to one side of the capacitor block 14. According to the present embodiment, a rectangular metal plate is bent, for example, into a channel-shaped cross section to provide an integral structure having the first joint 22a, the second joint 22b, and the third joint 22c. The first joint 22a and the extension 26 of the second electrode plate 20b are electrically connected to each other by solder, for example, and the second joint 22b and the connector 24 of the second electrode plate 20b are electrically connected to each other by solder, for example. The third joint 22c of the bypass electrode plate 22 should preferably be spaced from the one side of the capacitor block 14. An electric insulator may be interposed between the third joint 22c and the one side of the capacitor block 14.

The dimensional relationship between the bypass electrode plate 22 and the capacitor block 14 will be described below. If the length of the bypass electrode plate 22 along the stacked direction of the capacitor elements 12 is indicated by L, the number of the capacitor elements 12 of the capacitor block 14 by N, and the length of each of the capacitor elements 12 along the stacked direction by m, then the length L falls in the range of:

$m < L < m \times N.$

Particularly, the length L of the first capacitor 10A satisfies the range of:

$m \times (N-1) < L < m \times N.$

As described above, the first capacitor 10A has the capacitor elements 12 connected parallel to each other by the first electrode plate 20a and the second electrode plate 20b, and also has the single bypass electrode plate 22 that electrically bypasses the second electrode plate 20b whose connecting length is greater than the first electrode plate 20a and that is electrically connected to the second electrode plate 20b. Therefore, the first capacitor 10A has its self-inductance reduced for improved high-frequency characteristics and reduced self-heating thereof. Since the bypass electrode plate 22 only needs to be electrically connected to the second electrode plate 20b whose connecting length is greater than the first electrode plate 20a, the first capacitor 10A can be assembled in a simple way, requires no dedicated connecting structure (casing structure) to be prepared, and can deal flexibly with specification changes. These advantages lead to increased productivity and reduced cost of the first capacitor 10A.

The example shown in FIGS. 1A through 1C has four stacked capacitor elements 12. However, the present invention is applicable to a stack of two capacitor elements 12, three capacitor elements 12, or five or more capacitor elements 12.

As shown in FIGS. 2A through 2C, a capacitor according to a second embodiment (hereinafter referred to as "second capacitor 10B") is substantially identical in structure to the first capacitor 10A, but is different therefrom in that two bypass electrode plates 22 are arrayed along one side of the capacitor block 14 and that the length L of the bypass electrode plates 22 falls in the range of:

$m < L < 2 \times m.$

The second capacitor 10B offers the same advantages as those of the first capacitor 10A. The example shown in FIGS. 2A through 2C has four stacked capacitor elements 12. However, the present invention is applicable to a stack of five or more capacitor elements 12. If an odd number of five or more capacitor elements 12, such as five, seven, or nine capacitor elements 12 are stacked, then it is preferable to use, as the bypass electrode plates 22, a bypass electrode plate 22 whose length L is in the range of $2 \times m < L < 3 \times m$ in addition to a bypass electrode plate 22 whose length L is in the range of $m < L < 2 \times m$. In other words, if two or more bypass electrode plates 22 are arrayed along the stacked direction over the single capacitor block 14, then a bypass electrode plate 22 whose length L is in the range of $m < L < 2 \times m$ and a bypass electrode plate 22 whose length L is in the range of $2 \times m < L < 3 \times m$ may be used over various capacitor blocks each having four or more stacked capacitor elements 12.

As shown in FIGS. 3A through 3C, a capacitor according to a third embodiment (hereinafter referred to as "third capacitor 10C") is substantially identical in structure to the second capacitor 10B, but is different therefrom in that a bypass electrode plate 22 that is disposed in an upper position along the stacked direction has an upper end 22d positioned substantially in alignment with an upper surface 14a of the capacitor block 14.

The third capacitor 10C offers the same advantages as those of the second capacitor 10B. In particular, the third capacitor 10C has its self-inductance made smaller than the second capacitor 10B because the bypass electrode plate 22 that is disposed upwardly along the stacked direction is located closely to an end of the second electrode plate 20b (an end connected to an outer terminal).

As shown in FIGS. 4A through 4C, a capacitor according to a fourth embodiment (hereinafter referred to as "fourth capacitor 10D") is substantially identical in structure to the first capacitor 10A, but is different therefrom in that it has two bypass electrode plates 22 and the two bypass electrode plates 22 are disposed in confronting relation to each other across the capacitor block 14 interposed therebetween.

Since two bypass paths provided by the bypass electrode plates 22 between the connector 24 and the extension 26 of the second electrode plate 20b are connected parallel to each other, the self-inductance of the fourth capacitor 10D is about ½ of the self-inductance of the first capacitor 10A.

As shown in FIGS. 5A through 5C, a capacitor according to a fifth embodiment (hereinafter referred to as "fifth capacitor 10E") is substantially identical in structure to the second capacitor 10B (see FIGS. 2A through 2C), but is different therefrom in that it has four bypass electrode plates 22, two of the bypass electrode plates 22 are disposed in confronting relation to each other across the capacitor block 14 interposed therebetween in an upper position along the stacked direction of the capacitor block 14, and, likewise, two of the bypass electrode plates 22 are disposed in confronting relation to each other across the capacitor block 14 interposed therebetween in a lower position along the stacked direction of the capacitor block 14.

As with the fourth capacitor 10D, since two bypass paths between the connector 24 and the extension 26 of the second electrode plate 20b are connected parallel to each other, the self-inductance of the fifth capacitor 10E is about ½ of the self-inductance of the second capacitor 10B.

As shown in FIGS. 6A through 6C, a capacitor according to a sixth embodiment (hereinafter referred to as "sixth capacitor 10F") is substantially identical in structure to the third capacitor 10C (see FIGS. 3A through 3C), but is different therefrom in that it has four bypass electrode plates 22, two of the bypass electrode plates 22 are disposed in confronting relation to each other across the capacitor block 14 interposed therebetween in an upper position along the stacked direction of the capacitor block 14, and, likewise, two of the bypass electrode plates 22 are disposed in confronting relation to each other across the capacitor block 14 interposed therebetween in a lower position along the stacked direction of the capacitor block 14.

As with the fifth capacitor 10E, since two bypass paths provided by the two confronting bypass electrode plates 22 are connected parallel to each other, the self-inductance of the sixth capacitor 10F is about ½ of the self-inductance of the third capacitor 10C.

As shown in FIG. 7, a capacitor according to a seventh embodiment (hereinafter referred to as "seventh capacitor 10G") is substantially identical in structure to the fifth capacitor 10E (see FIGS. 5A through 5C), but is different therefrom in that it includes a cooling member 30 for cooling at least the second terminals 18b of the respective capacitor elements 12. The cooling member 30, which comprises a pipe 32 for passing a coolant (cooling water, cooling air, or the like), for example, therethrough, is disposed in a position confronting a region where the second terminals 18b are arrayed. The pipe 32 is disposed in contact with the second joints 22b of the bypass electrode plates 22. Therefore, heat generated by the second terminals 18b is radiated through the second electrode plate 20b and the second joints 22b of the bypass electrode plates 22 to the cooling member 30, and heat generated by the first terminals 18a is radiated through the first electrode plate 20a, the electric insulator, and the first joints 22a, the third joints 22c, and the second joints 22b of the bypass electrode plates 22 to the cooling member 30.

Usually, when a current greater than an allowable current flows through a capacitor, the temperature of the capacitor rises with time beyond the allowable temperature for the capacitor until eventually the capacitor may possibly produce smoke and catch fire. However, since the seventh capacitor 10G has the cooling member 30, the temperature of the seventh capacitor 10G does not go beyond the allowable temperature therefor even when a current greater than an allowable current flows through the seventh capacitor 10G. Therefore, the seventh capacitor 10G is prevented from suffering the above drawbacks.

The cooling member 30 may comprise a heat sink other than the pipe 32 through which the coolant flows, or may comprise a combination of the pipe 32 and a heat sink.

Figure 8:
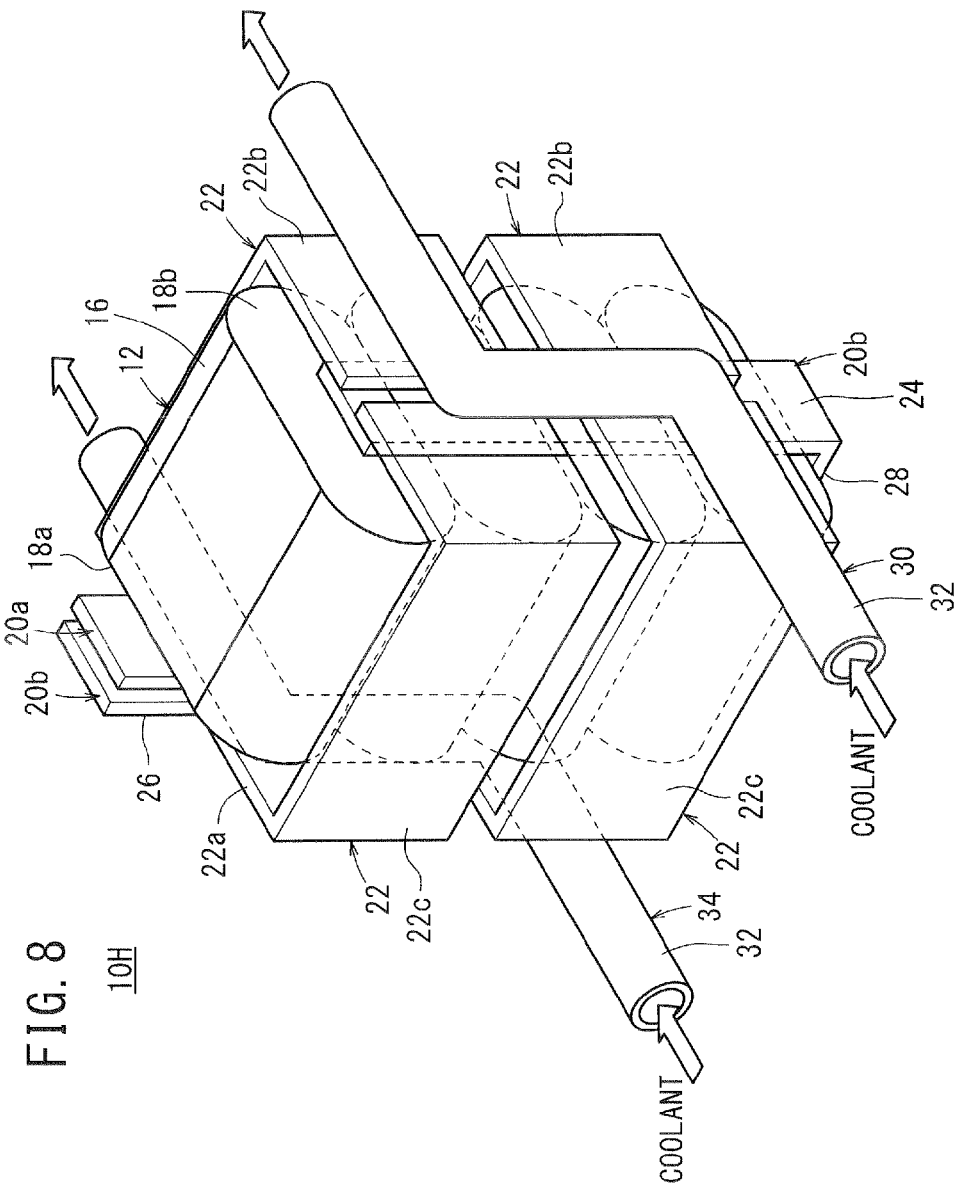
FIG. 8 is a perspective view of a capacitor according to an eighth embodiment (eighth capacitor)

As shown in FIG. 8, a capacitor according to an eighth embodiment (hereinafter referred to as "eighth capacitor 10H") is substantially identical in structure to the seventh capacitor 10G, but is different therefrom in that in addition to the cooling member 30 described above, a second cooling member 34 is disposed in a position confronting a region where the first terminals 18a are arrayed. As with the cooling member 30, the second cooling member 34 may comprise a pipe 32 for passing a cooling therethrough, a heat sink, or the like. The second cooling member 34 is disposed in contact with the first joints 22a of the bypass electrode plates 22. Therefore, heat generated by the first terminals 18a is radiated through the first electrode plate 20a, the electric insulator, and the first joints 22a of the bypass electrode plates 22 to the second cooling member 34. Consequently, heat generated by the first terminals 18a is radiated efficiently to the second cooling member 34.

A capacitor according to a ninth embodiment (hereinafter referred to as "ninth capacitor 10I") will be described below with reference to FIG. 9.

Figure 9:
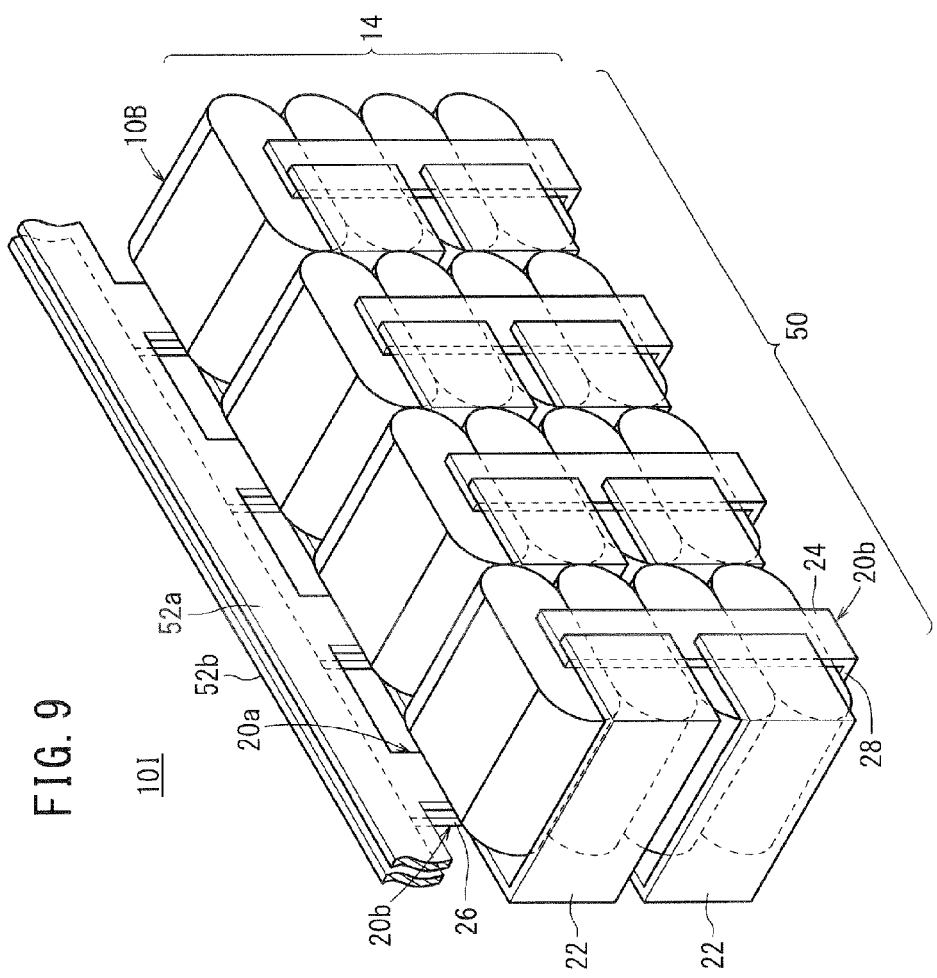
FIG. 9 is a perspective view of a capacitor according to a ninth embodiment (ninth capacitor)

As shown in FIG. 9, the ninth capacitor 10I has a compound capacitor block 50 made up of an array of capacitor blocks 14 having mutually facing sides. In FIG. 9, four second capacitors 10B (see FIG. 2A) are arrayed laterally (along a direction perpendicular to the stacked direction of capacitor elements 12) with adjacent ones of the second capacitors 10B having mutually facing sides. The first electrode plates 20a of the respective second capacitors 10B have ends connected to a common first lead terminal plate 52a, and the second electrode plates 20b of the respective second capacitors 10B have ends connected to a common second lead terminal plate 52b.

Since bypass paths (four bypass paths) provided by the bypass electrode plates 22 between the connectors 24 and the extensions 26 of the second electrode plates 20b of the respective second capacitors 10B are connected parallel to the common second lead terminal plate 52b, the self-inductance of the ninth capacitor 10I is about ¼ of the self-inductance of the second capacitor 10B.

Figure 10:
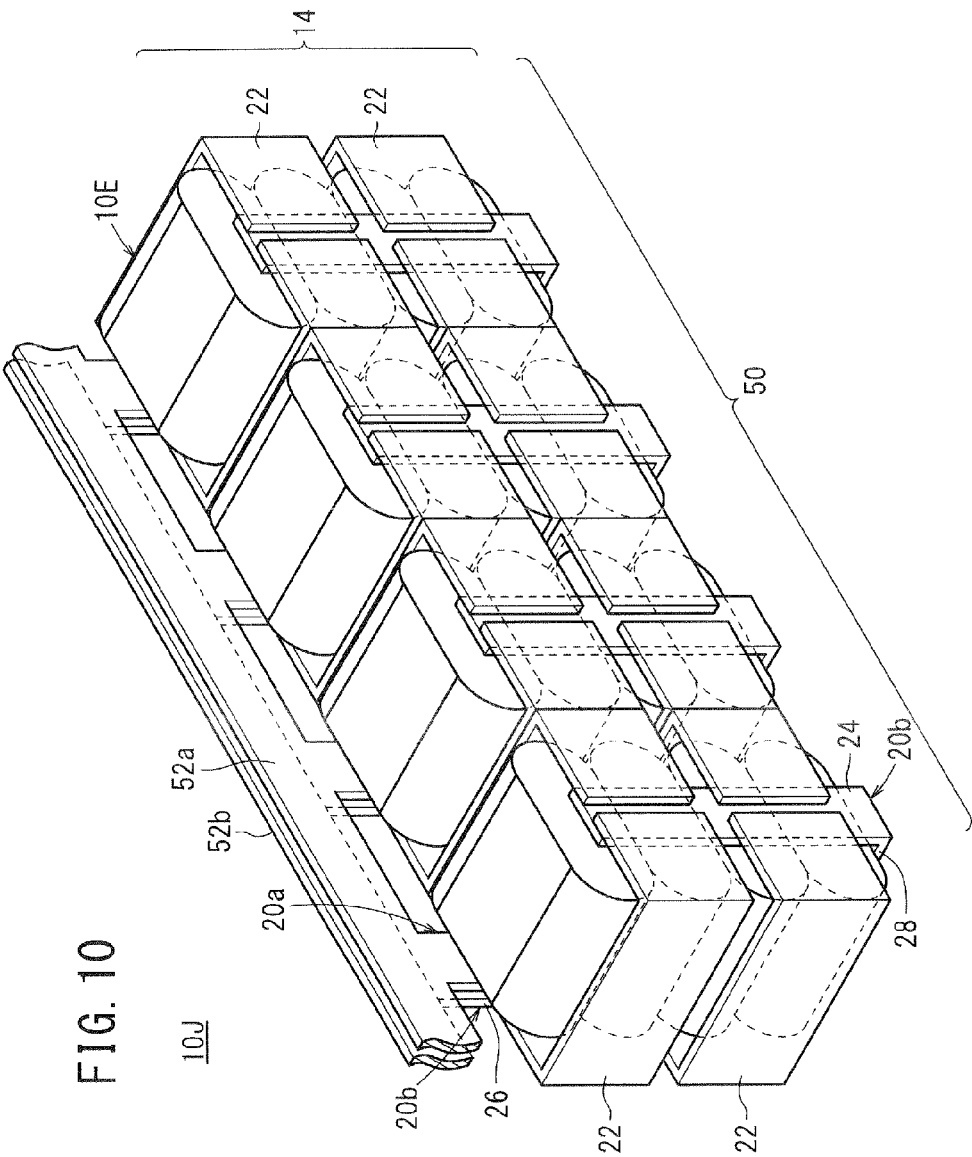
FIG. 10 is a perspective view of a capacitor according to a tenth embodiment (tenth capacitor)

As shown in FIG. 10, a capacitor according to a tenth embodiment (hereinafter referred to as "tenth capacitor 10J") has a compound capacitor block 50 made up of an array of capacitor blocks 14 having mutually facing sides. In particular, four fifth capacitors 10E are arrayed laterally (along a direction perpendicular to the stacked direction of capacitor elements 12) with adjacent ones of the fifth capacitors 10E having mutually facing sides. The first electrode plates 20a of the respective fifth capacitors 10E have ends connected to a common first lead terminal plate 52a, and the second electrode plates 20b of the respective fifth capacitors 10E have ends connected to a common second lead terminal plate 52b.

Since bypass paths (eight bypass paths) provided by the bypass electrode plates 22 between the connectors 24 and the extensions 26 of the second electrode plates 20b of the respective fifth capacitors 10E are connected parallel to the common second lead terminal plate 52b, the self-inductance of the tenth capacitor 10J is about ¼ of the self-inductance of the fifth capacitor 10E.

Figure 11:
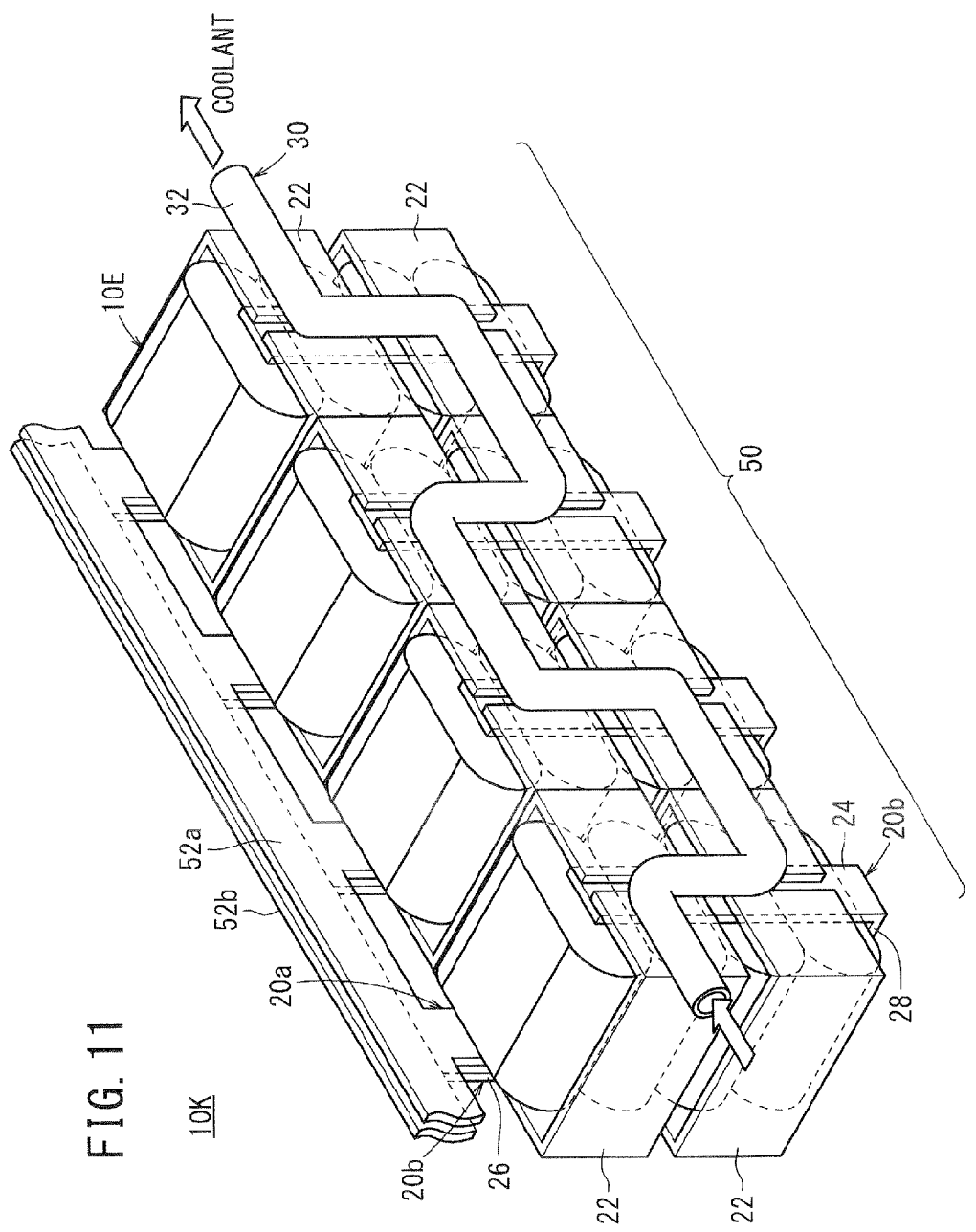
FIG. 11 is a perspective view of a capacitor according to an eleventh embodiment (eleventh capacitor)

As shown in FIG. 11, a capacitor according to an eleventh embodiment (hereinafter referred to as "eleventh capacitor 10K") is substantially identical in structure to the tenth capacitor 10J described above, but is different therefrom in that it includes a cooling member 30 for cooling at least the second terminals 18b of the respective capacitor elements 12. The cooling member 30, which comprises a meandering pipe 32 for passing a coolant (cooling water, cooling air, or the like), for example, therethrough, is disposed in a position confronting a region where the second terminals 18b are arrayed.

As with the seventh capacitor 10G (see FIG. 7), since the temperature of each capacitor does not go beyond the allowable temperature therefor even when a current greater than an allowable current flows through each capacitor. Therefore, the eleventh capacitor 10K is prevented from suffering the above drawbacks. As with the eighth capacitor 10H (see FIG. 8), a second cooling member 34 may be disposed in a position confronting a region where the first terminals 18a are arrayed.

INVENTIVE EXAMPLES

Capacitors according to Comparative Example and Inventive Examples 1 through 8 were measured for their capacitor inductances using a network analyzer.

The structures of the capacitors according to Comparative Example and Inventive Examples 1 through 8 are as follows:

Comparative Example

As shown in FIGS. 12A through 12C, the capacitor according to Comparative Example is similar to the first capacitor 10A shown in FIGS. 1A through 1C except that it lacks the bypass electrode plate 22. This structure is similar to the capacitor disclosed in Japanese Patent No. 3771977 described above.

Inventive Examples 1 through 8

The capacitor according to Inventive Example 1 is identical in structure to the first capacitor 10A shown in FIGS. 1A through 1C. The capacitor according to Inventive Example 2 is identical in structure to the second capacitor 10B shown in FIGS. 2A through 2C. The capacitor according to Inventive Example 3 is identical in structure to the third capacitor 10C shown in FIGS. 3A through 3C. The capacitor according to Inventive Example 4 is identical in structure to the fourth capacitor 10D shown in FIGS. 4A through 4C. The capacitor according to Inventive Example 5 is identical in structure to the fifth capacitor 10E shown in FIGS. 5A through 5C. The capacitor according to Inventive Example 6 is identical in structure to the sixth capacitor 10F shown in FIGS. 6A through 6C.

The capacitor according to Inventive Example 7 is identical in structure to the ninth capacitor 10I shown in FIG. 9. The capacitor according to Inventive Example 8 is identical in structure to the tenth capacitor 10J shown in FIG. 10.

(Measuring Process)

Figure 13:
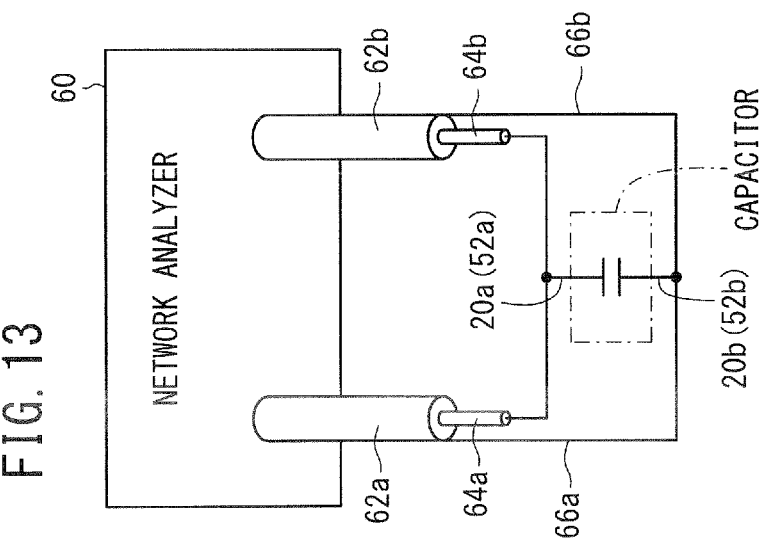
FIG. 13 is a view illustrative of a process of measuring the inductance of a capacitor.

A measuring process was carried out using a network analyzer 60 shown in FIG. 13. Specifically, each of the capacitors according to Comparative Example and Inventive Examples 1 through 8 was measured by connecting the connectors of inner cores 64a, 64b of coaxial cables 62a, 62b and the connectors of outer conductors 66a, 66b thereof (or vice versa) respectively to the end of the first electrode plate 20a (the first lead terminal plate 52a in the seventh and eighth examples) and the end (specifically, the external terminal of each capacitor) of the second electrode plate 20b (the second lead terminal plate 52b in the seventh and eighth examples). A measuring frequency was in the range from 100 Hz to 200 Hz, a measuring current was of several mA, and a measuring voltage was of several mV.

(Measurement Results)

Measurement results are shown in Table 1.

TABLE 1

| | Inductance (nH) |
|---|---|
| Comparative Example | about 69 |
| Inventive Example 1 | about 14 |
| Inventive Example 2 | about 15 |
| Inventive Example 3 | about 14 |
| Inventive Example 4 | about 8 |
| Inventive Example 5 | about 8 |
| Inventive Example 6 | about 7 |
| Inventive Example 7 | about 4 |
| Inventive Example 8 | about 2 |

It can be seen from the results shown in Table 1 that while the capacitor according to Comparative Example had an inductance of about 69 nH, each of the capacitors according to Inventive Examples 1 through 8 had an inductance of 15 hH or smaller, which was lower than the inductance of the capacitor according to Comparative Example, and had its high-frequency characteristics improved and its self-heating reduced.

As shown in FIG. 4A, the capacitor according to Inventive Example 4 has two parallel-connected bypass paths provided by the bypass electrode plates 22 unlike the structure according to Inventive Example 1 (see FIG. 1A), and has its inductance reduced to about ½ of the inductance of the capacitor according to Inventive Example 1.

As shown in FIG. 5A, the capacitor according to Inventive Example 5 also has two parallel-connected bypass paths provided by the bypass electrode plates 22 unlike the structure according to Inventive Example 2 (see FIG. 2A), and has its inductance reduced to about ½ of the inductance of the capacitor according to Inventive Example 2.

As shown in FIG. 6A, the capacitor according to Inventive Example 6 also has two parallel-connected bypass paths provided by the bypass electrode plates 22 unlike the structure according to Inventive Example 3 (see FIG. 3A), and has its inductance reduced to about ½ of the inductance of the capacitor according to Inventive Example 3.

As shown in FIG. 9, the capacitor according to Inventive Example 7 has bypass paths (four bypass paths) provided by the bypass electrode plates 22 of each of the second capacitors 10B, connected parallel to the common second lead terminal plate 52b, and has its inductance reduced to about ¼ of the inductance of each of the second capacitors 10B.

As shown in FIG. 10, the capacitor according to Inventive Example 8 has bypass paths (four bypass paths) provided by the bypass electrode plates 22 of each of the fifth capacitors 10E, connected parallel to the common second lead terminal plate 52b, and has its inductance reduced to about ¼ of the inductance of each of the fifth capacitors 10E.

According to the disclosure of Japanese Patent No. 3357314, the capacitor disclosed therein has an inductance that is about ¼ of the inductance of the capacitor according to Comparative Example, i.e., an inductance of about 17 nH, which is higher than the inductances of the capacitors according to Inventive Examples 1 through 8.

The capacitors according to the present invention are not limited to the above embodiments, but may employ various arrangements without departing from the scope of the present invention.

The invention claimed is:

1. A capacitor which employs a capacitor block made up of a plurality of capacitor elements which are electrically connected parallel to each other, each of the capacitor elements having terminals on respective ends thereof, comprising:
a first electrode plate electrically connecting respective ones of the terminals of the capacitor elements;

a second electrode plate electrically connecting respective other ones of the terminals of the capacitor elements and extending toward the ones of the terminals; and at least one bypass electrode plate electrically bypassing the second electrode plate;

wherein the second electrode plate includes a connector electrically connecting the respective other ones of the terminals of the capacitor elements, an extension facing the first electrode plate, and a joint interconnecting the connector and the extension, the connector, the extension, and the joint being integral with each other;

the bypass electrode plate includes a first joint electrically connected to the extension of the second electrode plate, a second joint electrically connected to the connector of the second electrode plate, and a third joint interconnecting the first joint and the second joint, the first joint, the second joint, and the third joint being integral with each other;

the joint of the second electrode plate is positioned below a lower surface of the capacitor block; and the third joint of the bypass electrode plate is positioned in facing relation to a side of the capacitor block.

2. The capacitor according to claim 1, wherein the bypass electrode plate comprises at least two bypass electrode plates disposed in confronting relation to each other across the capacitor block interposed therebetween.

3. The capacitor according to claim 1, wherein the bypass electrode plate comprises at least two bypass electrode plates arrayed along one side of the capacitor block.

4. The capacitor according to claim 1, wherein the at least one bypass electrode plate has an upper end positioned substantially in alignment with an upper surface of the capacitor block.

5. The capacitor according to claim 1, wherein the capacitor elements of the capacitor block are stacked along a stacked direction; and if a length of the bypass electrode plate along the stacked direction of the capacitor elements is indicated by L, a number of the capacitor elements of the capacitor block by N, and a length of each of the capacitor elements along the stacked direction by m, then the length L falls in a range of:

$m<L<m \times N.$

6. The capacitor according to claim 5, wherein the length L falls in a range of:

$m \times (N-1)<L<m \times N.$

7. The capacitor according to claim 5, wherein the length L of the at least one bypass electrode plate falls in a range of:

$m<L<2 \times m.$

8. The capacitor according to claim 1, further comprising:

a compound capacitor block made up of an array of at least two of the capacitor blocks having mutually facing sides.

9. The capacitor according to claim 1, further comprising:

a cooling member for cooling at least one of the ones of the terminals and the other ones of the terminals of the capacitor block;

wherein the cooling member is disposed in confronting relation to at least one of a region where the ones of the terminals of the capacitor block are arrayed and a region where the other ones of the terminals of the capacitor block are arrayed.

* * * * *